United States Patent [19]

Kimmel

[11] Patent Number: 5,657,117
[45] Date of Patent: Aug. 12, 1997

[54] DEVICE FOR EXAMINING OPTICAL WAVEGUIDES

[76] Inventor: Jyrki Kimmel, Näyttelijänkatu 27 G 23, FIN-33720 Tampere, Finland

[21] Appl. No.: 537,771
[22] PCT Filed: Apr. 21, 1994
[86] PCT No.: PCT/FI94/00151
§ 371 Date: Oct. 20, 1995
§ 102(e) Date: Oct. 20, 1995
[87] PCT Pub. No.: WO94/24536
PCT Pub. Date: Oct. 27, 1994

[30] Foreign Application Priority Data

Apr. 21, 1993 [FI] Finland ................... 931792

[51] Int. Cl.$^6$ ........................................ G01N 21/00
[52] U.S. Cl. ................ 356/239; 315/135; 315/138; 315/136
[58] Field of Search ................... 356/135, 138, 356/239, 136

[56] References Cited

U.S. PATENT DOCUMENTS 3,873,209  3/1975  Schinke et al. ........... 356/135
3,918,818  11/1975  Giles ......................... 356/239
4,692,024  9/1987  Bloss .
4,779,978  10/1988  Hatton et al. .
5,125,740  6/1992  Sato et al. ................. 356/135

FOREIGN PATENT DOCUMENTS 37 05 359  8/1988  Germany .

OTHER PUBLICATIONS

Derwent's abstract, No. 83–838217/49, week 8349, Abstract of SU 998894 (Legnd Kalinin Poly), 23 Feb. 1983.

*Primary Examiner*—Frank G. Font
*Assistant Examiner*—Reginald A. Ratliff
*Attorney, Agent, or Firm*—Pollock, Vande Sande & Priddy

[57] ABSTRACT

A device for examining optical waveguides comprises a prism to be positioned on the waveguide to be investigated, an entering point at which incoming light enters the device, and control devices for altering the angle of light directed to the prism from the entering point of incoming light, wherein the control devices include a mirror whereby the projection of the reflecting surface of the mirror in the plane of altering the angle is in the form of an ellipse, a rotatable mirror is placed at the focal point of the ellipse and the corner of the prism is situated at the second focal point of the same ellipse.

9 Claims, 3 Drawing Sheets

DEVICE FOR EXAMINING OPTICAL WAVEGUIDES

FIELD OF THE INVENTION

The object of the invention is a device for examining optical waveguides, which comprises a prism to be positioned on an optical waveguide under investigation, a point at which incoming light enters the device, as well as control means for altering the angle of light directed to the prism from the entering point of incoming light.

BACKGROUND OF THE INVENTION

Prism coupling is one of the most common methods to test integrated optical circuits and structures. It is used in connection with methods to determine the effective refractive indices and thicknesses of the waveguides, by means of the structure of the propagating modes of light within the waveguide. This technique is described in the publication by Tien, P. K., Ulrich, R., and Martin, R. J.: Modes of propagating light waves in thin deposited semiconductor films, Applied Physics Letters 14 (1969) 9, pp. 291–294. Prism coupling is also required in measuring distributions of propagating modes and attenuation in the structures.

The device by which the testing is to be performed comprises a source of light, such as a laser, a prism having an unbeveled corner to which the incoming ray of light is directed at a desired angle, as well as measuring devices such as a light detector and a CCD-camera situated perpendicularly to the waveguide. The light must be directed to the prism at a characteristic angle pertaining to one of the propagating modes in the waveguide. This requires that the source of light be turned with respect to the prism, e. g. by means of a goniometer. Since the source of light is often relatively large, its precise positioning places great demands on the fine mechanism of the device and at the least makes the whole device large and inflexible to varied geometries.

SUMMARY OF THE INVENTION

The purpose of this invention is to remove the drawbacks of the prior art and present a device, by means of which the positioning can be simplified and where the interchange of light sources can be easily performed. In order to realize this purpose, it is in general characteristic of the invention that the control devices include a mirror, whereby the projection of the reflective surface of the mirror in the plane of altering the angle is in the form of an ellipse, a rotatable mirror is placed at the focal point of the ellipse and the unbeveled corner of the prism is situated at the second focal point of the same ellipse. The point at which the light from the light source is directed to the waveguide under investigation by means of the mirrors, can then be constant within the device, and the angle at which the light enters the prism can then be altered by turning the rotatable mirror in the focal point of the ellipse, around an axis perpendicular to the plane in which the angle is varied. Since the point of the rotatable mirror at which light is projected is situated at the focal point of the ellipse, the ray of light impinging on the elliptic mirror will always be reflected precisely to the other focal point of the same ellipse, where the coupling corner of the prism in the prism coupler is located. The three-dimensional form of the mirror will also have options described further in the text.

Since the optics of the device are mostly reflecting, the device is also independent of the wavelength of light, and different light sources can then be used without adjustments.

According to one preferred embodiment, the device can be connected with the light source by means of an Optical fiber. The connecting point can then be made precise with respect to the mirror permanently, and no adjustment of the light source in the prism coupling device need be performed prior to measurements.

According to one further embodiment, the device will have manipulators, such as a micrometer screw, a linear DC motor, a stepping motor, or a piezoelectric manipulator, arranged to move the waveguide and the prism placed upon it, perpendicularly with respect to the direction of the light beam entering the device, so that the angle of the prism will stay at the other focal point of the ellipse. This permits for a larger area of the waveguide to be investigated at one time. In addition, other controls can be added in the device, by which the waveguide can be placed in positions relevant to imaging the waveguides.

The invention is described in detail by reference to the Figures included, wherein FIG. 1 represents the device pertaining to the invention perpendicular to the plane of turning of the light beams, FIG. 2 represents one preferred embodiment of the device, FIG. 3 represents one alternative to the embodiment of FIG. 1, FIG. 4 represents one alternative to the embodiment of FIG. 2, FIG. 5 represents the reflection of the light beams according to one alternative;

FIG. 6 represents some positioning alternatives of the waveguide.

DETAILED DESCRIPTION OF THE PREFERRED EMBODIMENTS

Figure 1:
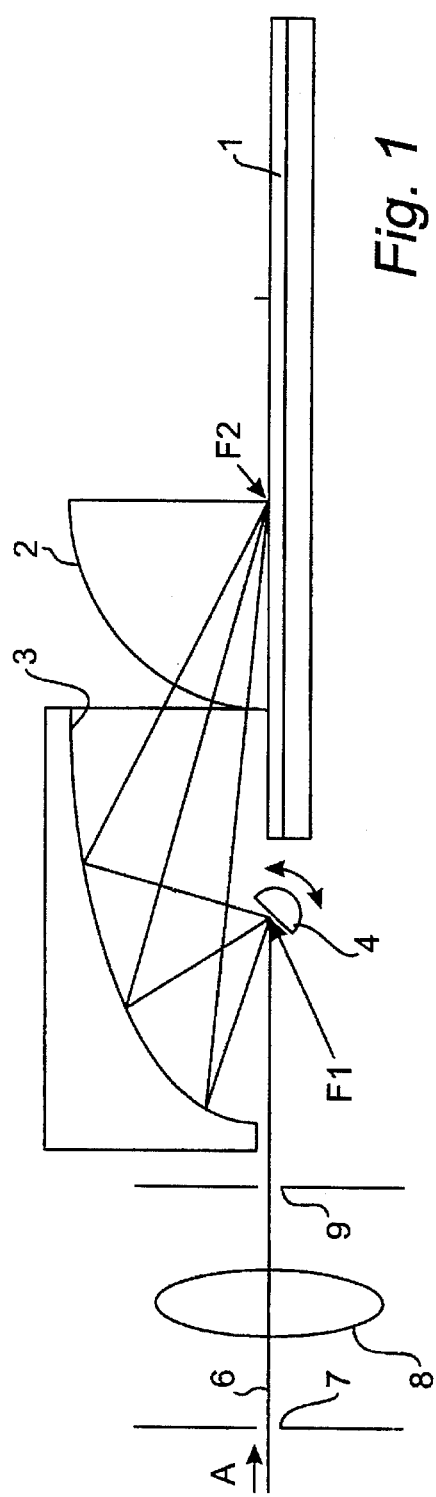

The device shown in FIG. 1 comprises a cylindrical prism 2 which is placed on a waveguide to be examined so that an air gap of desired width remains between the lower face of the prism and the upper surface of the waveguide. The prism will be positioned on the prism with accessories known in the art. A light beam 6 from a light source is directed in the direction of arrow A through a narrow opening, such as a pinhole or a slit 7 to the focusing optics 8, and further through a corresponding second opening 9 to a rotatable plane mirror 4. A second opening can be situated after the mirror as well, to enable alignment of the device. The said mirror is located in the focal point F1 of an ellipse defined by an elliptical mirror 3 so that the rotating axis of the mirror is positioned exactly in the said focal point. Rotating the plane mirror enables the light beam from the light source passing through the focusing optics, also impinging at the focal point F1, to be turned at varying angles to different points on the surface of the elliptical mirror 3, with the result that the beam will also be reflected at differing angles to the other focal point of the ellipse F2 where the unbeveled corner of the cylindrical prism 2 is located. The face of the prism directed towards the incoming rays of light is shaped as a sector of a cylinder having its center of curvature at the second focal point F2. This shape and location of the cylindrical prism enables the device to be beneficially independent of light wavelength in the alignment, adjustment and operation of the device. The cylindrical prism may be made of one piece or by attaching a part on the straight side of an ordinary prism, the outer face of the part being in the form of a cylinder surface.

The projection of the reflective surface of the elliptical mirror 3 in the plane where the angle of incoming light is varied must have the shape of an ellipse. According to one alternative embodiment, the reflecting surface is straight in a plane perpendicular to the main axis of the ellipse and the mirror is then simple to manufacture. The beam of light can thus be spread to a predetermined area.

Figure 5:
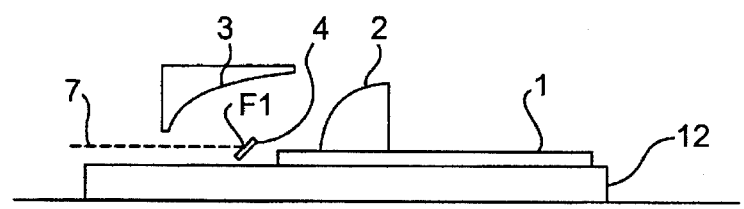

Alternatively, the mirror can be an ellipsoid according to FIG. 5, the reflecting surface being in this case in the shape of an arc in the plane and thus the beam of light is focused in one point. The surface of the ellipsoid mirror is then in the shape of a rotational body which is achieved by letting the ellipse rotate around its main axis. FIG. 5 shows the reflection schematically projected to a plane perpendicular to the optical axis. The light beam from the light source through the focusing optics will be reflected in a diverging beam (exaggerated in the Figure for clarity) from the rotating mirror 4 to the reflecting surface of mirror 3. Because the focal point is in the center of a circle, the arc of which determines the reflecting surface in the projection plane, the beam will again be focused by means of the reflecting surface also in a plane perpendicular to the optical axis to the second focal point F2 located on the main axis.

When using an ellipsoid mirror, prism 2 is in the shape of a spherical surface against the direction of incoming light beams, and the second focal point F2 will then be located at the center of curvature defined by the spherical surface. A prism like this can be made as a single piece or by attaching a separate piece with a spherical outer surface to the straight side of an ordinarily shaped prism. Thus all rays of light reflected from the mirror 3 will enter the prism 2 perpendicularly to its outer surface.

The plane mirror 4 can be rotated about its rotation axis by, for example, a micrometer screw, a DC motor, a stepping motor, or a piezoelectric manipulator. In addition, the prism 2 and the waveguide under investigation 1 can be translated perpendicularly with respect to the plane of turning of the light beams, and consequently, the unbeveled corner of the prism 2 remains in the focal point F2 and a wider area of the waveguide can be investigated. The translation can be realized by, for example, a micrometer screw, a DC motor, or a stepping motor, or a piezoelectric manipulator.

Figure 2:
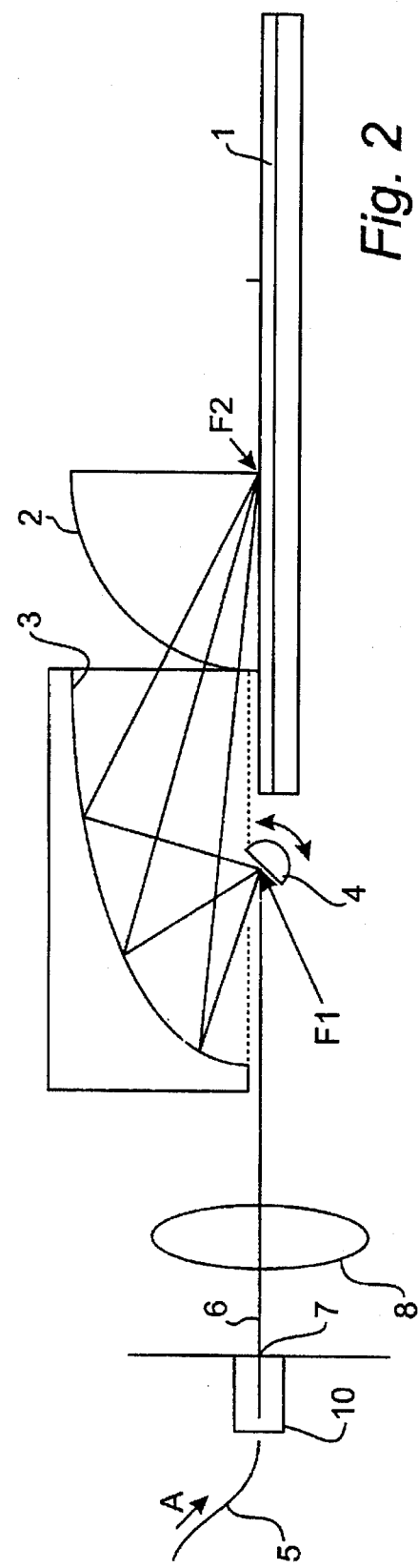
Figure 6:
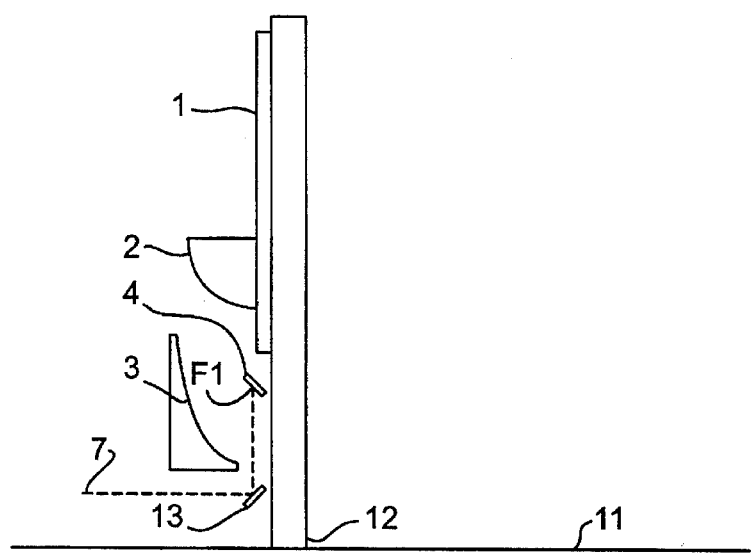

FIG. 6 presents alternatives for changing the position of the waveguide, in order to have an imaging camera located otherwise than just above the waveguide as in FIGS. 1 and 2. The change in the position of the waveguide is necessary also when the camera is heavy (for example, a liquid nitrogen cooled CCD camera) and the waveguide must be imaged in different positions. The device has accessories for moving waveguide 1 about an optical axis (the direction of incoming light to focal point F1). The parts rotating together in this case include at least parts numbered 1–4. The waveguide 1 and optics parts 2–4 are then situated in a separable (for example from an optical table 11) part 12 , which can be turned for example by 90 degrees or to another angle with respect to the optical table 11, and will be attached to the table in a manner allowing mirror 4 to remain at the optical axis. The table and the part have suitable attaching accessories by means of which parts 1–4 can be positioned correctly. In addition, parts 1–4 can be turned about an axis perpendicular to the optical axis in like principle. Thus, the beam of incoming light will be turned from the original direction with a separate mirror 13 to the extent required by the turning angle.

FIG. 2 represents a device similar to that of FIG. 1 that it differs from FIG. 1 in how the light is brought into the device. The light is brought in by means of an optical fiber 5. The device has a connecting point for attachment of an attach an optical fiber connector 10. From the fiber connector, the light is directed to the focal point F1 of the ellipse through a hole 7 and the focusing optics 8. The connecting point for attaching the fiber connector 10 can be made precise in position with respect to the focal point F1, and thus the light source can be changed without the need of aligning the beam of light over again.

Figure 3:
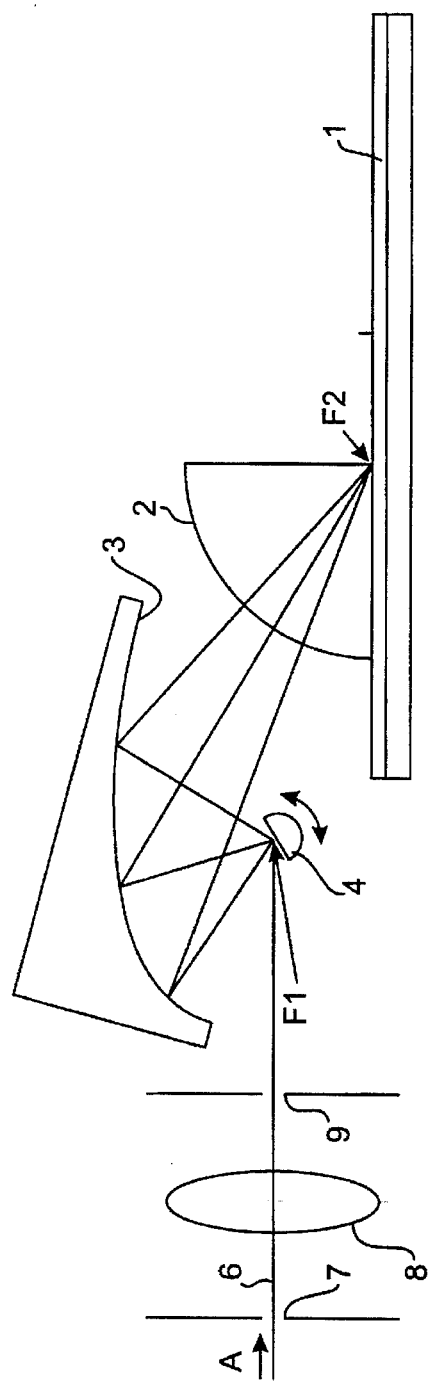
Figure 4:
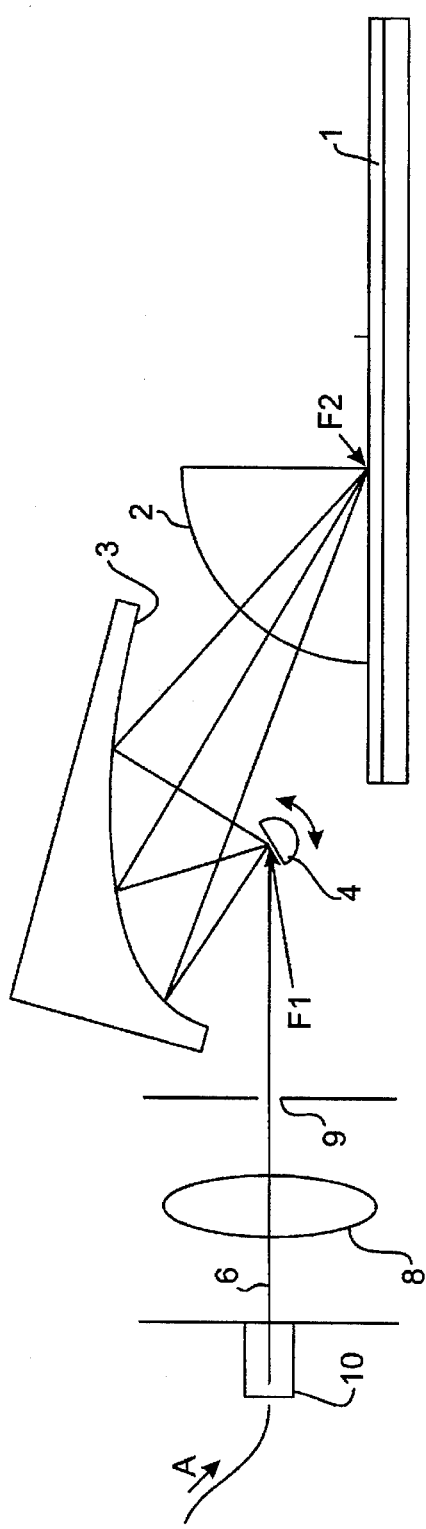

FIG. 3 presents an arrangement similar to that of FIG. 1, where the focal points F1 and F2 are not located on the same straight line as the optical axis 7 - F1, but in contrast the main axis of the ellipse is at an angle with respect to the former. The situation is depicted in FIG. 4 using the arrangement shown in FIG. 2.

At the location of the focusing optics, it is possible to arrange further a polarizer and/or other filters to change some properties of the incoming light. The signal can thus be enhanced and measurement possibilities be made more versatile, because when using a polarizer, the so called TE and TM modes are different in the waveguide. The accessories can be located in a suitable position between the point of incoming light and the plane mirror 4.

I claim:

1. A device for examining optical waveguides comprising a prism to be positioned on the waveguide to be investigated, an entering point at which incoming light enters the device, and control devices for altering the angle of light directed to the prism from the entering point of incoming light, wherein the control devices include a mirror whereby the projection of the reflecting surface of the mirror in the plane of altering the angle is in the form of an ellipse, a rotatable mirror is placed at the focal point of said ellipse and the corner of the prism is situated at the second focal point of the same ellipse.

2. A device according to claim 1, wherein the reflecting surface is straight in a plane perpendicular to the main axis of the ellipse.

3. A device according to claim 2, wherein the surface of the mirror is an ellipsoid, and the reflecting surface has the shape of an arc of a circle in a plane perpendicular to the main axis of the ellipse.

4. A device according to claim 1, wherein the entering point of incoming light comprises a connecting point for an optical fiber.

5. A device according to claim 1, wherein an element for changing property of light is provided between the entering point of incoming light and the rotatable mirror.

6. A device according to claim 1, further comprising manipulators, such as a micrometer screw, an DC motor, a stepping motor or a piezoelectric manipulator, for moving the waveguide and the prism located thereon perpendicularly to the direction of the beam of incoming light in such a manner that the corner of the prism remains at the second focal point of the ellipse.

7. A device according to claim 1, further including turning accessories for turning the waveguide together with the mirrors and the prism about the optical axis.

8. A device according to claim 1, further including turning accessories for turning the waveguide together with mirrors and the prism about an axis perpendicular to the optical axis.

9. A device according to claim 5, wherein said element is at least one of a polarizer and a filter.

* * * * *

UNITED STATES PATENT AND TRADEMARK OFFICE
CERTIFICATE OF CORRECTION

PATENT NO. : 5,657,117
DATED : August 12, 1997
INVENTOR(S) : Kimmel

It is certified that error appears in the above-identified patent and that said Letters Patent is hereby corrected as shown below:

Column 4, line 39, change "claim 2" to ---claim 1---.

Signed and Sealed this

Twenty-fourth Day of March, 1998

Attest:

BRUCE LEHMAN

Attesting Officer          Commissioner of Patents and Trademarks